US011166454B2

(12) United States Patent
Fuhr et al.

(10) Patent No.: US 11,166,454 B2
(45) Date of Patent: Nov. 9, 2021

(54) METHOD AND DEVICE FOR THE TEMPERATURE MONITORING OF A CRYOPRESERVED BIOLOGICAL SAMPLE

(71) Applicant: Fraunhofer-Gesellschaft zur Foerderung der angewandten Forschung e. V., Munich (DE)

(72) Inventors: Guenter R. Fuhr, Berlin (DE); Heiko Zimmermann, Waldbrunn (DE)

(73) Assignee: Fraunhofer-Gesellschaft zur Foerderung der angewandten Forschung e. V., Munich (DE)

( * ) Notice: Subject to any disclaimer, the term of this patent is extended or adjusted under 35 U.S.C. 154(b) by 389 days.

(21) Appl. No.: 16/095,591

(22) PCT Filed: Mar. 31, 2017

(86) PCT No.: PCT/EP2017/000404
§ 371 (c)(1),
(2) Date: Oct. 22, 2018

(87) PCT Pub. No.: WO2017/186331
PCT Pub. Date: Nov. 2, 2017

(65) Prior Publication Data
US 2019/0082682 A1 Mar. 21, 2019

(30) Foreign Application Priority Data

Apr. 27, 2016 (DE) .......................... 102016005075.6

(51) Int. Cl.
*A01N 1/02* (2006.01)
*G01K 11/06* (2006.01)

(52) U.S. Cl.
CPC ......... *A01N 1/0268* (2013.01); *A01N 1/0236* (2013.01); *G01K 11/06* (2013.01); *G01K 2203/00* (2013.01)

(58) Field of Classification Search
None
See application file for complete search history.

(56) References Cited

U.S. PATENT DOCUMENTS 1,917,048 A 10/1931 Midgley, Jr.
2,955,942 A 10/1960 Fenity et al.
(Continued)

FOREIGN PATENT DOCUMENTS

CN 1419512 A 5/2003
CN 1687757 A 10/2005
(Continued)

OTHER PUBLICATIONS

Document entitled Description JPH07167716A, machine translation of JP H07-167716 previously made of record by applicant, translation provided by Espacenet (Year: 1995).*
(Continued)

*Primary Examiner* — Holly Kipouros
(74) *Attorney, Agent, or Firm* — Caesar Rivise, PC

(57) ABSTRACT

The invention relates to a device for the temperature monitoring of a cryopreserved biological sample, comprising a sample container having an accommodating space (2) for accommodating the sample and comprising an indicating apparatus, which can be arranged on the outside of the sample container, for monitoring at least one temperature limit value. The indicating apparatus has at least one cavity, which is only partially filled with an indicating substance, the melting temperature of which lies in a range from −20 ° C. to −140 ° C. The indicating apparatus can be designed, in particular, as a cylindrical body, which can be fastened to a cryotube as a bottom part, or alternatively as a double-walled hollow cylinder, which can be slid onto an outer lateral surface of the cryotube. The indicating apparatus can also be fastened to a lateral outer wall of the sample
(Continued)

container, e.g. as a hollow body that can be inserted into a sleeve or insertion pocket.

14 Claims, 10 Drawing Sheets

(56) References Cited

U.S. PATENT DOCUMENTS

| | | | |
|---|---|---|---|
| RE25,499 E | 12/1963 | Fenity et al. | |
| 3,701,282 A | 10/1972 | Peterson | |
| 3,958,528 A | 5/1976 | Hill | |
| 4,134,359 A | 1/1979 | Redpath | |
| 4,137,049 A | 1/1979 | Couch et al. | |
| 4,195,056 A | 3/1980 | Patel | |
| 4,280,361 A | 7/1981 | Sala | |
| 4,509,449 A | 4/1985 | Chalmers | |
| 4,664,056 A | 5/1987 | Jehanno | |
| 4,844,622 A | 7/1989 | Weiss | |
| 5,057,434 A | 10/1991 | Prusik et al. | |
| 5,102,233 A | 4/1992 | Staerk et al. | |
| 5,182,212 A | 1/1993 | Jalinski | |
| 5,282,684 A | 2/1994 | Holzer | |
| 5,444,989 A * | 8/1995 | Gawron | G01K 11/06 374/E11.006 |
| 5,964,181 A * | 10/1999 | Pereyra | G01K 11/06 116/206 |
| 6,913,160 B2 * | 7/2005 | Bourreau | B65D 41/0492 206/459.1 |
| 7,097,353 B2 | 8/2006 | Wieder | |
| 7,387,438 B2 | 6/2008 | Parker | |
| 7,415,939 B2 | 8/2008 | Dip | |
| 8,122,844 B2 | 2/2012 | Smith et al. | |
| 8,168,138 B2 | 5/2012 | Che et al. | |
| 8,173,388 B2 | 5/2012 | Pasmore et al. | |
| 9,046,292 B2 | 6/2015 | Burke et al. | |
| 9,097,594 B2 | 8/2015 | Rastegar et al. | |
| 9,222,903 B2 | 12/2015 | Crevatin et al. | |
| 9,279,732 B2 | 3/2016 | Parker | |
| 9,296,500 B2 | 3/2016 | Childs et al. | |
| 9,464,973 B2 | 10/2016 | Fuhr et al. | |
| 9,618,398 B2 | 4/2017 | Deng et al. | |
| 10,048,138 B2 | 8/2018 | Smith et al. | |
| 10,408,686 B2 | 9/2019 | Newport et al. | |
| 10,917,941 B2 | 2/2021 | Schryver et al. | |
| 2003/0047477 A1 | 3/2003 | Nygardh et al. | |
| 2006/0078036 A1 | 4/2006 | Wieder | |
| 2007/0098039 A1 | 5/2007 | Parker | |
| 2008/0056329 A1 | 3/2008 | Smith et al. | |
| 2009/0129434 A1 | 5/2009 | Creus et al. | |
| 2012/0175412 A1 * | 7/2012 | Grabiner | G06Q 30/0623 235/375 |
| 2014/0318437 A1 | 10/2014 | Hong et al. | |
| 2014/0334520 A1 | 11/2014 | Chen et al. | |
| 2019/0075786 A1 | 3/2019 | Milne et al. | |
| 2019/0113397 A1 | 4/2019 | Fuhr et al. | |
| 2019/0285482 A1 | 9/2019 | Abdo et al. | |
| 2020/0029551 A1 | 1/2020 | Fuhr et al. | |
| 2020/0362292 A1 | 11/2020 | Hoehse et al. | |
| 2021/0010873 A1 | 1/2021 | Aida et al. | |

FOREIGN PATENT DOCUMENTS

| | | | |
|---|---|---|---|
| CN | 1809734 A | 7/2006 | |
| CN | 101198850 A | 6/2008 | |
| CN | 201731955 U | 2/2011 | |
| CN | 102369387 A | 3/2012 | |
| CN | 102379278 A | 3/2012 | |
| CN | 102844649 A | 12/2012 | |
| CN | 102853946 A | 1/2013 | |
| CN | 104501994 A | 4/2015 | |
| CN | 104583741 A | 4/2015 | |
| CN | 103630503 B | 4/2016 | |
| CN | 205175785 U | 4/2016 | |
| CN | 109152354 A | 1/2019 | |
| DE | 74651 A1 | 7/1970 | |
| DE | 2130926 A | 12/1972 | |
| DE | 2504078 A1 | 8/1976 | |
| DE | 8435794 U1 | 3/1985 | |
| DE | 3712201 A1 | 9/1988 | |
| DE | 3716972 A1 | 12/1988 | |
| DE | 3731268 A1 | 4/1989 | |
| DE | 3838661 A1 | 6/1989 | |
| DE | 3940163 A1 | 6/1991 | |
| DE | 19960920 A1 | 6/2001 | |
| DE | 20301688 U1 | 5/2003 | |
| DE | 10203630 A1 | 8/2003 | |
| DE | 20301123 U1 | 3/2004 | |
| DE | 102005041495 A1 | 3/2007 | |
| DE | 102006003995 A1 | 8/2007 | |
| DE | 102006003995 B4 | 4/2008 | |
| DE | 102006045821 A1 | 4/2008 | |
| DE | 102008028334 A1 | 12/2009 | |
| DE | 102008031666 A1 | 1/2010 | |
| DE | 102008031666 B4 | 5/2010 | |
| DE | 102006055331 B4 | 12/2010 | |
| DE | 102010052434 A1 | 5/2012 | |
| DE | 102011010120 A1 | 8/2012 | |
| DE | 102011115467 A1 | 4/2013 | |
| DE | 102012202565 A1 | 8/2013 | |
| DE | 102013108557 B3 | 11/2014 | |
| DE | 102014018308 A1 | 6/2016 | |
| EP | 0606033 A1 | 7/1994 | |
| EP | 1560009 A1 | 8/2005 | |
| EP | 2937850 A1 | 10/2015 | |
| EP | 2984928 A1 | 2/2016 | |
| FR | 2370269 A2 | 6/1978 | |
| FR | 2508164 A1 | 12/1982 | |
| FR | 2641611 A1 | 7/1990 | |
| FR | 2662798 A1 | 12/1991 | |
| FR | 2929705 A1 | 10/2009 | |
| FR | 3013836 A1 | 5/2015 | |
| GB | 2416842 A | 2/2006 | |
| JP | 55-500 A | 1/1980 | |
| JP | 56-1322 A | 1/1981 | |
| JP | S6055235 A | 3/1985 | |
| JP | 60-500460 A | 4/1985 | |
| JP | 4-109336 U | 9/1992 | |
| JP | H05-99754 A | 4/1993 | |
| JP | H07-167716 A | 7/1995 | |
| JP | 2002-323386 A | 11/2002 | |
| JP | 2004-77215 A | 3/2004 | |
| JP | 2006047030 A | 2/2006 | |
| JP | 2008151716 A | 7/2008 | |
| JP | 2008542736 A | 11/2008 | |
| JP | 2009-128137 A | 6/2009 | |
| JP | 2009-524806 A | 7/2009 | |
| JP | 2012-173282 A | 9/2012 | |
| JP | 2012219017 A | 11/2012 | |
| WO | 9802722 A1 | 1/1998 | |
| WO | 0047964 A1 | 8/2000 | |
| WO | 2004077001 A1 | 9/2004 | |
| WO | 2006128899 A1 | 12/2006 | |
| WO | 2007012132 A1 | 2/2007 | |
| WO | 2007039094 A1 | 4/2007 | |
| WO | WO-2007054160 A2 * | 5/2007 | ............ A01N 1/02 |
| WO | 2007085385 A1 | 8/2007 | |
| WO | 2008027814 A2 | 3/2008 | |
| WO | 2015078767 A1 | 6/2015 | |

OTHER PUBLICATIONS

Pitt et al. (2008). 2008 Best practices for repositories: collection, storage, retrieval and distribution of biological materials for research. Cell Preservation Technology, 6(1), 3-58.
Ren et al. (2009). Evaluation of an outside-the-cold-chain vaccine delivery strategy in remote regions of western china. Public Health Reports, 124, 745-750.
Ruedel et al. (2015). Richtlinie zur probenahme und probenbearbeitung: transport von umweltproben unter cryobedingungen. Umwelt Bundesamt, 1-8.
Shirley et al. (2009). A large-scale cryoelectronic system for biological sample banking. Cryogenics, 49, 638-642.

(56) References Cited

OTHER PUBLICATIONS

Simione. (2012). A guide for proper cryogenic preservation. Thermo Fisher Scientific, 1-14.
Thermo Fisher Scientific. (2010). Thermo scientific nunc cryobank vials and bank-it tube system. Product Literature, 1-8.
Thermo Fisher Scientific. (2014). Automated sample storage resource guide. Product Literature, 1-24.
Thermo Fisher Scientific. (2015). Thermo scientific sample storage products. Product Literature, 1-18.
Thermo Fisher Scientific. (2016). The anatomy of the a cryogenic tube. Product Literature, 1-8.
WarmMark. (2014). WarmMark Technical Data Sheet. Product Literature, 1-11.
International Search Report of PCT/EP2017/000404 dated Jul. 11, 2017.
English Abstract for EP 0606033 A1 (1994).
Machine Translation of Abstract for JP 4-109336 U (1992).
English Abstract for JP H07-167716 A (1995).
English Abstract for JP 2012219017 A (2012).
English Translation of Oct. 5, 2020 Office Action in JP 2018-556888.
English Abstract for CN 103630503 B (2016).
English Abstract for CN 205175785 U (2016).
Machine Translation for DD 74651 A1 (1970).
English Abstract for DE 2130926 A (1972).
English Abstract for DE 2504078 A1 (1976).
English Abstract for DE 3712201 A1 (1988).
English Abstract for DE 3716972 A1 (1988).
English Abstract for DE 3731268 A1 (1989).
English Abstract for DE 3838661 A1 (1989).
Machine Translation for DE 8435794 U1 (1985).
English Abstract for DE 10203630 A1 (2003).
English Abstract for DE 19960920 A1 (2001).
English Abstract for DE 20301123 U1 (2004).
English Abstract for DE 20301688 U1 (2003).
English Abstract for DE 102005041495 A1 (2007).
English Abstract for DE 102006045821 A1 (2008).
English Abstract for DE 102008028334 A1 (2009).
English Abstract for DE 102008031666 A1 (2010).
English Abstract for DE 102008031666 B4 (2010).
English Abstract for DE 102010052434 A1 (2012).
English Abstract for DE 102011010120 A1 (2012).
English Abstract for DE 102011115467 A1 (2013).
English Abstract for DE 102012202565 A1 (2013).
English Abstract for DE 102013108557 B3 (2014).
English Abstract for DE 102014018308 A1 (2016).
English Abstract for FR 2370269 A2 (1978).
English Abstract for FR 2508164 A1 (1982).
English Abstract for FR 2641611 A1 (1990).
English Abstract for FR 2662798 A1 (1991).
English Abstract for FR 2929705 A1 (2009).
English Abstract for FR 3013836 A1 (2015).
English Abstract for JP S6055235 A (1985).
Machine Translation for JP 2006047030 A (2006).
Machine Translation for JP 2008151716 A (2008).
3M (2006). 3M Monitor Mark. Time Temperature Indicators. Product Literature, 1-4.
Biocision LLC. (2013). Snap freezing using dry ice or liquid nitrogen. Product Literature, 1-2.
Capture of http://www.cryoguard.com/key-information/ retrieved from internet archive on Jun. 21, 2017.
Durst et al. (2007). Management, interchange and reproducible execution of sample preparation knowledge in collaborative research scenarios. Proceedings of I-Know '07 Graz, Austria. 111-117.
FreezCube (2008). Screenshot from video at 2:23. FreezCube, Invention Géniale! Youtube. Published at https://www.youtube.com/watch?v=ZjPf7YP5r68 on Sep. 22, 2008.
FreezCube (2010). Le gardien de vos surgelees. Product Literature, 1-13.
Germann et al. (2013). Temperature fluctuations during deep temperature cryopreservation reduce PBMC recovery, viability and T-cell function. Cryobiology, 67, 193-200.
Goodell et al. (2016). Ring test evaluation of the detection of influenza A virus in swine oral fluids by real-time reverse-transcription polymerase chain reaction and virus isolation. The Canadian Journal of Veterinary Research, 80, 12-20.
Ihmig et al. (2006). Cryogenic electronic memory infrastructure for physically related "continuity of care records" of frozen cells. Cryogenics, 46, 312-320.
Ihmig et al. (2009). The technology of the global HIV vaccine research cryorepository. Engineering in Life Sciences, 9(5), 376-383.
Ihmig et al. GHRC/CAVD-technology: new identification, storage and distribution technologies for vaccine related reagents and specimens, In AIDS Research and Human Retroviruses (M. Liebert ed. 2010). A68-A69.
Ihmig et al. (2013). Frozen cells and bits: cryoelectronics advances biopreservation. IEEE Pulse, 4(5), 35-43.
Meiser et al. (2009). Entwicklung und evaluierung einer mikrosystembasierten anlage zur kryokonservierung von multizellulaeren aggregaten. Proceedings of Mirosystemtechnik Kongress, Berlin, Germany, Paper 102.
National Institute of Environmental Health Sciences. (2015). Specimen cold chain SOP—processing, transportation & storage temperatures. Product Literature, 1-6.
Partial Translation for FreezCube (2010). Le gardien de vos surgelees. Product Literature, 1-13.
Partial Translation for PRETSCHNER. (2011). Thermotransportsysteme fuer biomedizische anwendungen. Proceedings of Innovationsforum Bio-Logistik, Leipzig, Germany. Powerpoint Presentation, 75-88.
English Abstract for CN 1687757 A (2005).
English Abstract for CN 201731955 U (2011).
English Abstract for CN 104501994 A (2015).
English Abstract for JP 2002-323386 A (2002).
English Abstract for JP 2004-77215 A (2004).
English Abstract for JP 2009-128137 A (2009).
English Abstract for JP 2012-173282 A (2012).
Chinese Office Action with Translation dated Dec. 3, 2020.
Japanese Office Action with Translation dated Jan. 6, 2021.
English Abstract for DE 3940163 A1 (1991).
Chinese Office Action dated Jul. 1, 2021.

\* cited by examiner

Melting temperature [°C]

Ethanol [Mass %]

Melting temperature [°C]

Wt. % KOH

Melting temperature [°C]

% Antifreeze in water

| | |
|---|---|
| Ammonia | -77.8 |
| Ethyl alcohol | -114.5 |
| Benzene | + 5.5 |
| Bromine | -7.3 |
| Chloroform | -63.5 |
| Diethyl ether | -116.3 |
| Acetic acid | + 16.7 |
| Glycerine | -18.0 |
| Isopentane | -160.0 |
| Methyl alcohol | -97.9 |
| Propyl alcohol | -127.0 |
| Quicksilver | -38.9 |
| Carbon disulphide | -111.6 |
| Carbon tetrachloride | -22.9 |
| Toluene | -94.5 |

FIG. 10

METHOD AND DEVICE FOR THE TEMPERATURE MONITORING OF A CRYOPRESERVED BIOLOGICAL SAMPLE

CROSS-REFERENCE TO RELATED APPLICATIONS

This application is a U.S. National Phase Application of PCT/EP2017/000404, filed Mar 31, 2017, which claims priority to DE 10 2016 005 075.6, filed Apr. 27, 2016, the contents of which applications are incorporated herein by reference in their entireties for all purposes.

BACKGROUND OF THE INVENTION

The invention relates to a method for temperature monitoring of a cryopreserved biological sample. The invention further relates to a device for temperature monitoring of a cryopreserved biological sample.

The low-temperature preservation (cryopreservation) of cells is hitherto the only possibility of stopping vital processes reversibly (maintaining vitality) at a cellular level such that they can restart after heating to physiological temperatures. Cryopreservation has developed by way of large biobanks in recent decades to become an essential element for clinics, pharmaceutical companies, species survival, environmental protection and health provision. Biological material is stored in low-temperature-compatible sample containers (cryogenic containers), e.g. tubes, straws and bags, of various sizes. In the case of cryopreservation, the stored biomaterial is frozen while maintaining the vitality of the sample material, usually at temperatures below $-80°$ C., for living collections below $-140°$ C. to the temperature of liquid nitrogen. The term "cryogenic sample" is also used below for a cryopreserved sample or a sample intended for cryopreservation.

Numerous techniques have been developed for macroscopic samples, such as e.g. blood or tissue, for sample storage at low temperatures. There is a tendency in modern medicine, genetic engineering and biology to increasingly subject small samples to cryopreservation. For example, small suspension volumes (milliliter or below) with suspended cells or groups of cells are frozen. The cryopreservation of cells from in-vitro cultures is primarily carried out in a suspension. However, the majority of biomedically significant cells require a substrate contact for their propagation and proper development. Samples are therefore frozen in the substrate-bound state possibly after cultivation.

The quality of the samples is of decisive importance since they are used for cell therapies in clinics, the development of pharmaceuticals and biotechnological products, as national resources and many other things. The storage time varies from a few days up to decades, with a tendency towards long-term storage. The samples are stored in cooled containers, are usually located in metal drawers and racks, with which they are subjected to temperature fluctuations in the case of new deposits or removals. In the case of living storage (cells, cell suspensions and pieces of tissue), it is not only the uninterrupted cooling chain which plays a vital role, but also the avoidance of large jumps in temperature in the deep-freezing phase. Since it is not unknown during removal for cryogenic containers to heat up to temperatures of $-80°$ C. to $-20°$ C., despite the fact they are still frozen, reductions in quality unknowingly arise which not only reduce the value of the sample, but can also lead to life-threatening situations when they are used in the clinical sector. Even if samples have only thawed briefly, it is not possible to see in the refrozen state that they no longer match the original condition. However, it is especially important to not only identify a thawing of the biomaterial, but also to document the exceeding of a threshold temperature in the range between $-140°$ C. and $-20°$ C. Temperature control and documentation for each sample is the requirement, one which has hitherto only seldom been satisfied, and if so, with high technical outlay. One must also remember extensive laboratory tests after thawing which also use valuable sample material and generate costs even in the case of cryogenic samples which have become worthless in the interim.

One object of the invention is thus to provide an improved method for temperature monitoring of a cryopreserved biological sample, with which disadvantages of conventional techniques can be avoided and which is characterized by a simplified execution of the method. A further object is to provide a device for temperature monitoring of a cryopreserved biological sample with which disadvantages of conventional techniques can be avoided.

A further object is to provide a possibility in order to be able to identify from as simple as possible a marker whether a cryogenic sample has been heated above a definable threshold temperature, even if only for a short time. It must be possible to fix the threshold temperature in the range between $-20°$ C. and $-140°$ C. prior to freezing. This should be possible quickly and in a readily apparent manner at each individual cryogenic sample and at thus millions of samples, must not change the biomaterials and should already be carried out in the deep-frozen state. If possible, it should be possible to detect the condition of the sample even in the storage container since every time the sample is removed from and returned to storage there is the risk of a change in sample of a plurality of samples in the store since entire racks are generally pulled up. The device and the method should be easy to handle, low-temperature-tolerant and adjustable. It must consume no or only a small amount of energy and result in only the smallest of costs since the storage of a biological sample in the cooled state should only cost a few Euros in terms of total outlay. The materials used must also satisfy this requirement.

These objects are achieved by devices and methods of the invention and are explained in greater detail in the following description with partial reference to the figures.

According to a first aspect of the invention, the stated objects are achieved by a method for temperature monitoring of a cryopreserved biological sample. A device for temperature monitoring of a cryopreserved biological sample is provided to carry out the method.

According to a second aspect of the invention, the device for temperature monitoring of a cryopreserved biological sample should be disclosed and capable of being claimed as the subject matter per se. The embodiments relating to the device, in particular its advantageous embodiment variants, should thus, in order to avoid repetition, be regarded as disclosed as device features in connection with the device and as device features in connection with and according to the method and capable of being claimed as such.

The device for temperature monitoring of a cryopreserved biological sample comprises a sample container with a receiving space (sample reservoir) for receiving a sample, in particular a biological sample. The device further comprises an indicator apparatus, which can be arranged and/or is arranged on the outside of the sample container, for monitoring at least one temperature threshold value. The indicator apparatus has at least one cavity which is only partially filled with an indicator substance, the melting temperature of which at normal pressure, therefore at 1013.25 mbar, lies in a range from −20° C. to −140° C. The melting temperature may also lie in a range from −20° C. to −100° C. The at least one cavity is not fluidically connected to the receiving space of the sample container so that the indicator substance cannot come into direct contact with a sample located in the receiving space. The term "can be arranged and/or is arranged" should encompass "can be fastened and/or is fastened", "can be coupled and/or is coupled", "can be connected and/or is connected".

At least one additional compartment which can be used as an indicator element as a result of partial filling with the indicator substance is provided by the indicator apparatus of the device according to the invention in order to display an undesired exceeding of the threshold temperature.

The sample container is a container which is suitable for cryopreservation, for example, a tube, a straw (also referred to as a seed tube), a bag for blood or stem cell storage, a box or another container which is suitable for cryopreservation. Such containers are correspondingly also referred to as cryogenic tubes, cryogenic straws, cryogenic bags, cryogenic boxes or generally as cryogenic containers.

Cryogenic tubes are also referred to as biobank or cryobank tubes. Cryogenic tubes have a receiving space which forms an inner cavity for receiving a biological sample. The cryogenic tube furthermore normally has a cover for closing off the receiving space. The cover can have an engagement via which the cover can be rotated with a tool. The cryogenic tube can also have a base element which has a marking, e.g. in the form of machine-readable code.

The method further comprises freezing the indicator substance(s), wherein the at least one cavity of the indicator apparatus is moved into a first position during freezing of the indicator substance(s). In the first position, the indicator substance in the liquid state flows into a first sub-volume of the cavity of the indicator apparatus and freezes there. After freezing, in particular before and during the monitoring phase of cryogenic storage, the at least one cavity with the indicator substance frozen in each case therein and at a temperature of the indicator substance(s) below the melting temperature is moved into a second position in which a melting of the indicator substance leads, as a result of the influence of gravity, to an at least partial change in configuration of the indicator substance in the respective cavity.

The change in configuration may be an at least partial change in the position of the indicator substance and/or the shape of the indicator substance, e.g. the surface shape. If the indicator substance melts in the second position, it will flow under the influence of gravity into a second sub-volume and freeze again there if the temperature falls back below the melting point.

In other words, the indicator substance is frozen in such a geometry or position and the at least one cavity of the indicator apparatus is changed in its position in the deep-frozen state, e.g. at the storage temperature or at least below the fixed threshold temperature or melting temperature of the indicator substance, so that melting of the indicator substance leads, after the change in position, to a visible displacement of the liquid or its delimiting geometry. On the basis of this change of the liquid, which can be e.g. dyed or made clearly apparent in a different manner, it is possible to determine immediately by looking or also in a technically automated manner whether the threshold temperature has been exceeded.

According to the method, it is thus possible to store the device, having the sample container with a cryopreserved sample located therein and the indicator apparatus, for cryopreservation, wherein the indicator device is arranged on the sample container so that the at least one cavity is located in the second position.

At a later point in time, it is possible to check whether a change in configuration of the frozen indicator substance, e.g. an at least partial displacement and/or a change in shape of the indicator substance, has taken place.

If this is the case, it can be concluded that the melting temperature of the indicator substance and thus the threshold temperature to be monitored have been exceeded, in particular even if only for a short time.

One particular advantage of the invention thus lies in the fact that a change in configuration of the indicator substance directly shows whether a cryogenic sample has heated up over a definable threshold temperature, even if only for a short time. This can be determined quickly and easily by visual inspection or also in a technically automated manner by means of a correspondingly configured measuring apparatus without the sample having to be removed from the sample container or thawed out.

According to one particularly preferred embodiment, the indicator apparatus may have a plurality of cavities which are filled in each case only partially with an indicator substance, the melting temperature of which lies in a range from −20° C. to −140° C., wherein the indicator substances in the cavities have different melting temperatures. Different temperature threshold values can thus be monitored, wherein each indicator substance is selected and/or its mixture ratio is adjusted so that its melting point corresponds to one of the temperature threshold values to be monitored. This embodiment has the advantage that the achieved temperature intervals which the sample has reached can be more precisely restricted.

The indicator apparatus or the at least one cavity of the indicator apparatus may furthermore be capable of being fastened and/or fastened detachably to the sample container, for example, by means of at least one plug connection, latching connection, clamping connection, screw connection and/or click connection. This has the advantage that the indicator apparatus can be stored and prepared spatially separate from the sample container (e.g. freezing the indicator substance in the first position). The term detachable fastening should also encompass in particular a pushing on, gluing on or plugging on of the indicator apparatus onto the sample container.

The indicator apparatus may furthermore be transparent or semi-transparent at at least one point so that the at least one cavity or a change in configuration of an indicator substance located in the cavity can be observed from the outside. To this end, in particular a wall of the at least one cavity may be transparent or semi-transparent at at least one point. The entire wall of the at least one cavity is preferably embodied to be transparent or semi-transparent.

For the purpose of improved detectability, the indicator substance may contain an indicator additive which improves detectability of a physical property of the indicator substance. The indicator additive may be, for example, a dye so that the indicator substance is colored or dyed, i.e. not transparent, and thus its shape and/or position is optically better apparent.

In principle, any dye which satisfies at least the following conditions is possible as a dye:
  intensive dyeing capacity even in small quantities and concentrations (e.g. starting from a saturated dye solution addition in the range <1% by volume, generally in the parts-per thousand or sub-parts-per-thousand range).

frost-tolerant lightfast at the dispatch temperatures and also the relevant low temperatures soluble in all components of the indicator substance no separation during freezing no reaction with plastic materials which come into contact with the indicator substance.

The dye is preferably selected from the group which comprises triphenylmethane dyes, rhodamine dyes, in particular xanthene, azo dyes as well as phenazine and phenothiazine dyes.

In more specific embodiments, the dye is selected from the group which comprises oil red, methyl red, brilliant green, rhodamine B, neutral red, methylene blue or other dyes which are used to dye cells in cytology.

The indicator additive may be particles, in particular nanoparticles which increase a scattering action and/or polarisation action of the indicator substance for electromagnetic radiation striking the indicator substance. As a result, a change in configuration of the indicator substance may be detected more reliably by means of optical transmission measurement, scattering measurement and/or polarization measurement. The indicator additive may be conductive particles. The conductivity or impedance of the indicator substance may be influenced by adding conductive particles. In this manner, a change in configuration of the indicator substance may be detected by means of a conductivity measurement or impedance measurement.

According to one preferred embodiment, the device may have a measuring apparatus which is configured to detect a position of the indicator substance(s) in the at least one cavity. The measuring apparatus may be an optical or optical-electric measuring apparatus in order to ascertain a change in configuration of the indicator substance e.g. with an optical transmission, scattered light or reflection measurement.

A substance, the melting temperature of which corresponds to a predetermined threshold temperature, the exceeding of which should be monitored, may be selected as the indicator substance. The indicator substance is a liquid or a mixture of different liquids, the melting point of which corresponds to the desired threshold temperature. Merely by way of example, a mixture of water ($H_2O$) and ethanol ($C_2H_6O$), a mixture of water ($H_2O$) and potassium hydroxide (KOH) or a mixture of water and an antifreeze may be selected as the indicator substance. The mixture ratio is adjusted according to the respective melting diagram which indicates the profile of the melting point as a function of the mixture ratio so that the melting point of the liquid mixture has the desired value, namely the threshold temperature to be monitored.

According to one preferred embodiment, the indicator substance comprises at least one alcohol which is selected from the group which comprises octan-1-ol, nonan-1-ol, propane-1,2-diol, propane-1,3-diol, butane-1,2-diol, butane-1,3-diol, butan-2-ol, pentane-1,5-diol, pentan-1-ol, cyclopentanol, benzyl alcohol. The at least one alcohol is particularly preferably selected from propane-1,3-diol, propane-1,2-diol and butan-2-ol.

According to another preferred embodiment, the indicator substance comprises at least two different alcohol components:

a) an alcohol selected from the group which comprises octan-1-ol, nonan-1-ol, propane-1,2-diol, propane-1,3-diol, butane-1,2-diol, butane-1,3-diol, butan-2-ol, pentane-1,5-diol, pentan-1-ol, cyclopentanol, benzyl alcohol;

b) an alcohol selected from the group which comprises octan-1-ol, nonan-1-ol, propane-1,2-diol, propane-1,3-diol, butane-1,2-diol, butane-1,3-diol, butane-2-ol, pentane-1,5-diol, pentan-1-ol, cyclopentanol, benzyl alcohol with a lower melting point than the alcohol of component a);

wherein the mixing ratio of components a) and b) are adjusted so that the melting temperature of the mixture lies within a temperature range from −20° C. to −160° C., in particular from −25° C. to −160° C. or −50° C. to −150° C.

More specific embodiments are characterized in that the indicator substance comprises one of the following combinations of components a) and b):

octan-1-ol and butan-2-ol in a mixture ratio of 5% to 95% by volume;

octan-1-ol and pentan-1-ol in a mixture ratio of 5% to 95% by volume;

octan-1-ol and propane-1,2-diol in a mixture ratio of 5% to 95% by volume;

nonan-1-ol and butan-2-ol in a mixture ratio of 5% to 95% by volume;

nonan-1-ol and propane-1,2-diol in a mixture ratio of 5% to 95% by volume;

nonan-1-ol and pentan-1-ol in a mixture ratio of 5% to 95% by volume;

propane-1,2-diol and butan-2-ol in a mixture ratio of 5% to 95% by volume;

propane-1,2-diol and propane-1,3-diol in a mixture ratio of 5% to 95% by volume;

propane-1,2-diol and butane-1,2-diol in a mixture ratio of 5% to 95% by volume;

propane-1,3-diol and butan-2-ol in a mixture ratio of 5% to 95% by volume;

propane-1,3-diol and butane-1,2-diol in a mixture ratio of 5% to 95% by volume;

pentane-1,5-diol and butan-2-ol in a mixture ratio of 5% to 95% by volume;

benzyl alcohol and butan-2-ol in a mixture ratio of 5% to 95% by volume;

pentan-1-ol and butan-2-ol in a mixture ratio of 5% to 95% by volume;

pentan-1-ol and methanol in a mixture ratio of 5% to 95% by volume;

cyclopentanol and butan-2-ol in a mixture ratio of 5% to 95% by volume;

cyclopentanol and propane-1,2-diol in a mixture ratio of 5% to 95% by volume;

cyclopentanol and pentan-1-ol in a mixture ratio of 5% to 95% by volume;

cyclopentanol and butane-1,2-diol in a mixture ratio of 5% to 95% by volume; wherein the indicated value of the mixture ratio relates in each case to the ratio of the former component in the mixture of both components.

According to particularly preferred embodiments, this indicator mixture comprises, for example, propane-1,2-diol and butan-2-ol in a mixture ratio of 40% to 60% by volume (produces a melting temperature of approx. −90° C.), propane-1,2-diol and propane-1,3-diol in a mixture ratio of 30% to 70% by volume, or propane-1,3-diol and butan-2-ol in a mixture ratio of 30% to 70% by volume.

The indicator substance preferably also comprises, in addition to the at least one alcohol, at least one dye as described above. This dye is particularly preferably selected from the group which comprises oil red, methyl red, brilliant green and rhodamine B.

An even more specific embodiment is characterized in that the indicator substance comprises two alcohols a) and b), which are selected from propane-1,3-diol, propane-1,2- diol and butan-2-ol, preferably in a mixture ratio as indicated above, as well as a dye which is selected from the group which consists of oil red, methyl red, brilliant green and rhodamine B.

The concentration of the dye in the alcohol component can vary greatly depending on the dye and alcohol.

In the case of intensive coloring, the concentration should generally be kept as low as possible so that the dye molecules do not change the freezing and melting properties of the alcohols in which they are dissolved or increase their viscosity. The dye concentration typically lies in a range of <10% by volume, in particular <1% or <0.1%, i.e. in the percent or parts per thousand or sub-parts per thousand range.

In one variant of the present invention, the threshold temperature to be monitored does not correspond directly to the melting temperature of the indicator substance, but rather that temperature above the melting temperature at which the viscosity of the melted substance has reduced to such an extent that the required liquid transport can take place.

This temperature is also referred to here as the threshold temperature and typically lies in a temperature range of 3-30° C. or 5-30° C., for example, 3-10° C., 3-20° C., 5-10° C. or 5-20° C., above the nominal melting temperature.

In one advantageous embodiment, the indicator substance is therefore characterized in that the liquid mixture in a temperature range of 3-30° C. or 5-30° C. above the melting temperature has a viscosity in a range from 10 to $10^6$ mPa*s, preferably 10 to $10^4$ mPa*s.

It was already mentioned above that the sample container may be a cryogenic tube. According to this variant, the indicator apparatus may be embodied, for example, as a cylindrical body which can be fastened to the cryogenic tube as a base part. This has the advantage that the indicator apparatus additionally assumes the function of a base part, known per se, of a cryogenic tube which ensures vertical stability of the cryogenic tube. A further advantage is that the indicator apparatus, if this replaces a conventional base part, does not require additional installation space.

It is particularly advantageous in this case if the cylindrical body has the same outer diameter as the cryogenic tube so that the device can be stored in conventional storage receptacles of a cryogenic storage apparatus for cryogenic tubes. The cylindrical body may be embodied to be transparent or semi-transparent, i.e. manufactured from a transparent or semi-transparent material.

According to a further embodiment of the invention, the indicator apparatus may be embodied as a hollow cylinder which is closed on all sides, which is provided on the underside of the sample container, e.g. in the form of a cryogenic tube, and which can be fastened detachably in particular to the underside of the sample container. The inner space of the hollow cylinder forms at least one cavity.

The inner space may be embodied as only one cavity which is partially filled with the indicator substance. The inner space may alternatively also be divided into several sub-cavities which are fluidically separated from one another and which are filled in each case partially with an indicator substance. The indicator substances of the sub-cavities preferably differ at least in terms of their melting temperature so that the exceeding of a different temperature threshold value can be monitored by each sub-cavity.

According to a further embodiment of the invention, the indicator apparatus may be fastened as a base part to the sample container, e.g. as a base part of a cryogenic tube, and has on its underside at least one insertion opening, in which a container, in particular a pin-shaped container, which is only partially filled with the indicator substance, is detachably retained. This has the advantage that the indicator apparatus may be quickly and flexibly fitted with at least one container which contains the indicator substance. The container can, for example, be inserted into the insertion opening and locked in the inserted position.

If the sample container has a cylindrical outer shell surface, e.g. in the case of a cryogenic tube, a further advantageous possibility of the realization according to the invention provides that the indicator apparatus is embodied as a hollow cylinder, which, for fastening to the cryogenic tube, can be pushed and/or is pushed onto an outer shell surface of the cryogenic tube. The hollow cylinder is embodied to be double-walled with an inner wall and an outer wall. An intermediate space between the inner wall and the outer wall, which forms the at least one cavity, is partially filled with the indicator substance.

One advantage of this exemplary embodiment lies in the fact that a conventional sample container can be used without modifications to the arrangement of the indicator apparatus being required.

The cavity of the hollow cylinder may in turn be embodied either as only one cavity which is filled partially with the indicator substance or be divided into several sub-cavities which are fluidically separated from one another and which are in each case partially filled with an indicator substance.

According to one variant of this exemplary embodiment, the hollow cylinder may be produced from a first plastic material and the sample container may be produced from a second plastic material. In this case, the first plastic material has greater thermal contraction than the second plastic material in the case of a reduction in temperature, at least in a temperature range below the melting temperature of the indicator substance.

In other words, the coefficients of expansion of the plastic materials of the sample container and of the hollow cylinder may be selected to be different and indeed so that bringing the hollow cylinder slightly below the melting temperature of the indicator substance or slightly below the lowest melting temperature is performed when using several different indicator substances and that the hollow cylinder at the storage temperature wedges with the sample container and is thus more difficult to detach. If someone thus heats up the sample in an unauthorized manner, he or she would have to immediately replace the cylinder, which can be avoided in that these cylinders are not freely available at the cryogenic tanks. An unauthorized replacement of the indicator apparatus may thus be avoided or at least made difficult.

According to a further preferred embodiment, the indicator apparatus has at least one hollow body, in particular an elongated hollow body, which is only partially filled with the indicator substance and is fastened to a lateral outer wall of the sample container.

In this case, it is possible on one hand that the hollow body is fastened by means of a plug, click or latching connection to the sample container. This enables a rapid attachment of the hollow body with the indicator substance on the sample container. Moreover, the hollow body may be fastened rotatably to the sample container. As a result of this, the hollow body may, in a state fastened to the sample container, be moved both into the first and into the second position.

It is furthermore possible on the other hand that there is provided on a lateral outer wall of the sample container a receptacle, for example, in the form of a sleeve or insertion pocket into which the hollow body can be inserted and/or is inserted for retention on the sample container.

The term sample container refers in particular to a container configured for cryopreservation. The sample container is preferably produced using low-temperature-compatible plastic material for temperatures below −140° C. The plastic material may tolerate repeated temperature changes without change and without damage. A plastic material is preferably used, the water absorbing capacity of which is <1% of the net mass, in particular <0.1% of the net mass. Cryogenic storage elements according to the invention are based, for example, on polyurethane or polyethylene.

The term "biological sample" refers to biological material such as cells, tissue, cell components, biological macromolecules, etc. which are subjected to cryopreservation in the sample container, where applicable, in a suspension and/or in combination with a substrate material. A substrate which is configured for adherent receiving of biological cells which are part of the biological sample can thus be arranged in the receiving space.

BRIEF DESCRIPTION OF THE DRAWINGS

The preferred embodiments and features of the invention described above may be combined with one another. Further details and advantages of the invention are described below with reference to the enclosed drawings. In the drawings:

FIG. 10 shows a mixability matrix of solvents.

DETAILED DESCRIPTION OF PREFERRED EMBODIMENTS

Identical elements or functionally equivalent elements are designated by the same reference numbers in all the figures and are partially not described separately.

Figure 1:
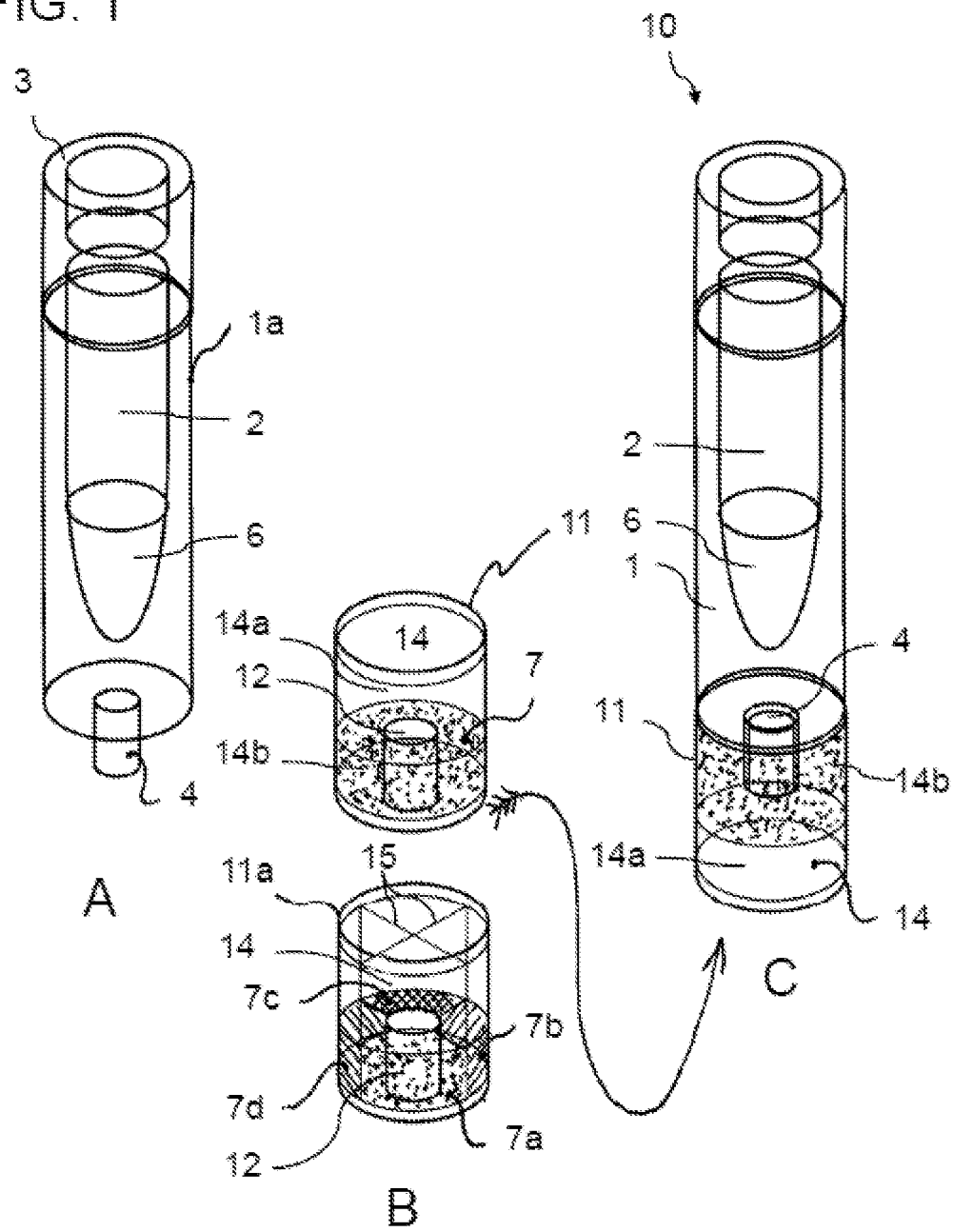
FIGS. 1-6 show schematic views of various exemplary embodiments of a device for temperature monitoring of a cryopreserved biological sample.

FIG. 1A shows a sample container in the form of a cryogenic tube 1a. It comprises a receiving volume 2 for the biosample in which the biomaterials are located. The biosample may be, for example, a cell suspension 6. Cryogenic tube 1a further comprises a cover 3 which closes off the vessel. The cover may possess at its upper side an engagement 4 via which cover 3 can be rotated with a tool (respectively not shown) in the case of automation. Cryogenic tubes which are known per se, as shown, for example, in FIG. 2, may also contain a base 5 into which a barcode rectangle or another marker is optionally inserted. A particular feature of the exemplary embodiment shown in FIG. 1 lies in the fact that the base element of cryogenic tube 1a simultaneously serves as an indicator apparatus 11.

Figure 10:
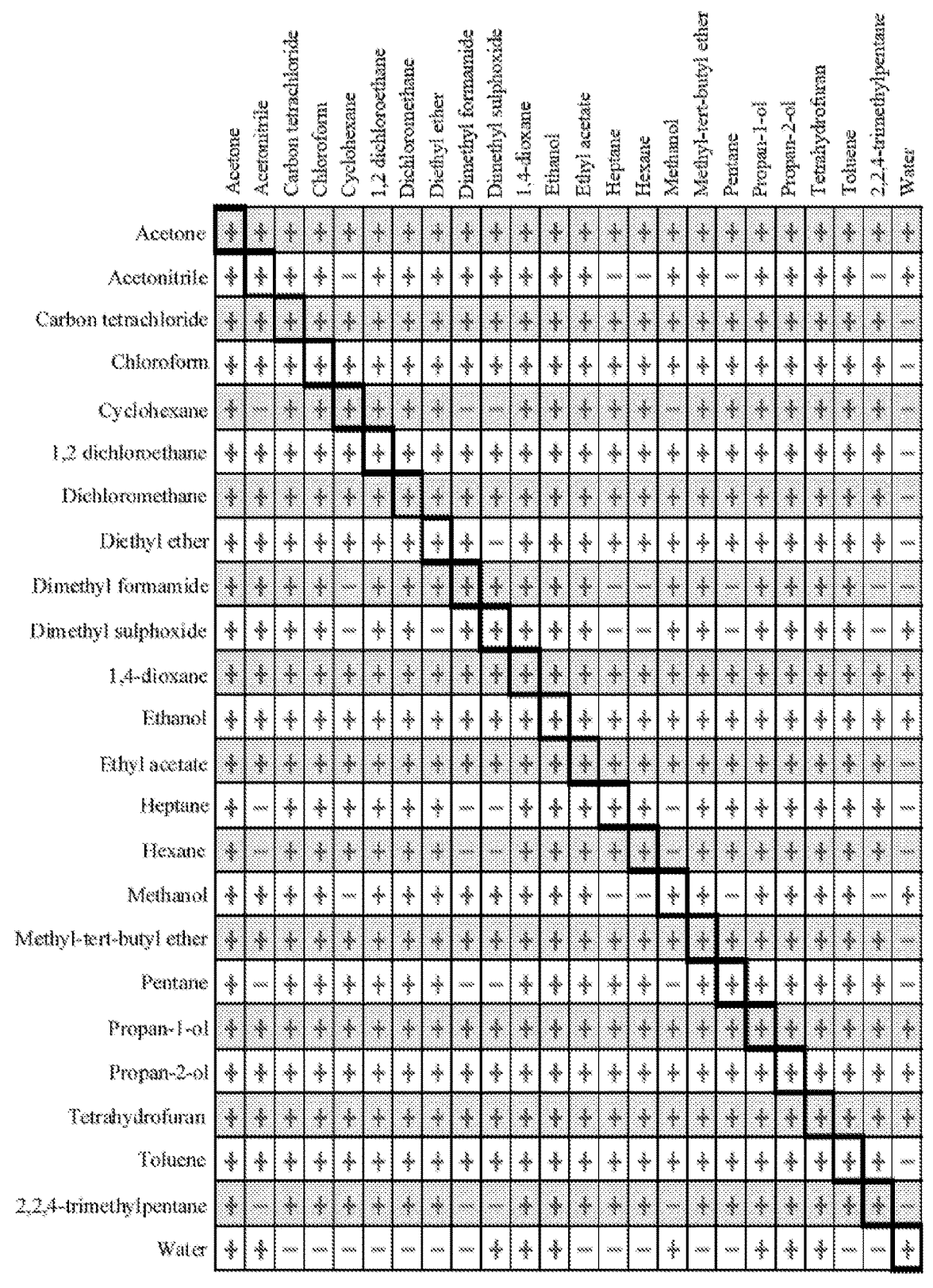

The cylindrical base part or indicator apparatus 11 has a closed off cavity 14 which is filled partially with an indicator substance 7 in the form of a liquid or a liquid mixture, the freezing point/melting point of which is selected in the range from −20° C. to −100° C. via the mixture ratio. This is also explained in greater detail below on the basis of FIGS. 8 to 10.

Base part 11, in a first position, here upside-down, is brought to the storage temperature which lies below the melting temperature of indicator substance 7 and only fastened to cryogenic tube 1a when it has also reached the storage temperature. The first position is represented in FIG. 1B. The indicator substance occupies a first sub-volume 14b within cavity 14.

In a second position, the base part is fastened to the cryogenic tube. To this end, base part 11 is rotated by 180° starting from the first position so that frozen indicator substance 7 is now located above free volume 14a, as represented in FIG. 1C. Fastening of base part 11 to the cryogenic tube is performed via a journal 4 which projects on the underside of cryogenic tube 1a and is brought into engagement with a form-corresponding receptacle 12 of indicator apparatus 11. Of course, other expediently embodied fastening possibilities can alternatively be provided such as threaded, latching or clamping connections, etc., in order to fasten indicator apparatus 11 as a base part to cryogenic tube 1a.

In the arrangement shown in FIG. 1C, usually standing perpendicularly in receptacles, device 10, comprising the cryogenic tube and indicator apparatus 11 fastened thereto, is stored in a low-temperature container, e.g. a cryogenic tank.

In the event of an exceeding of the melting temperature of indicator substance 7, it flows onto the base of volume 14 in sub-region 14a, which is easily apparent or can be easily detected. If sample 6 has been kept under the freezing point of indicator substance 7 at all times, instead the state as shown in FIG. 1C is produced. In this manner, an inadmissible heating of sample 6 is easily apparent. Device 10, in particular indicator apparatus 11, enables in this manner monitoring whether a temperature threshold value (melting temperature) was exceeded during cryogenic storage.

A further embodiment variant of the indicator apparatus or of base part 11a is represented in the lower part of FIG. 1B. As is apparent, volume 14 of base part 11a can also be divided into sub-regions which are closed off with respect to one another, here separated by separating walls 15. Each of the sub-regions is in turn partially filled with an indicator substance 7a, 7b, 7c, 7d, wherein indicator substances 7a, 7b, 7c, 7d have different melting points, e.g. −50° C., −60° C., −70° C. and −100° C.

Attachment to cryogenic tube 1a is performed as already described for indicator apparatus 11. Depending on which indicator substance or indicator substances 7a, 7b, 7c, 7d is/are later located on the base of cavity 14, this indicates which temperatures were exceeded. If all indicator substances 7a, 7b, 7c, 7d are located in the upper region of volume 14, the sample is unchanged and has been stored correctly.

Base parts 11, 11a are manufactured from a transparent material so that the position of the indicator substance(s) in volume 14 can be easily observed from the outside. The position of indicator substance 7 or indicator substances 7a, 7b, 7c, 7d within base part 11 or base part 11a can be optically detected by appearance, but also optoelectrically and in an automated manner by means of an expediently configured measuring apparatus. If the indicator substance is dyed, this facilitates determination of the position. A further advantage of device 10 is the reusability of base parts 11, 11a and the use of marker liquids used as an indicator substance 7 with a freely selectable freezing point. For living racks, a melting temperature around −80° C. is recommended since here a clear recrystallisation of the ice in the cells and around these occurs which leads to a reduction in quality of the cryogenic sample. For biological liquids and storage of genetic material which is stored at −80° C., a melting point of around −30° C. is to be recommended.

Figure 2:
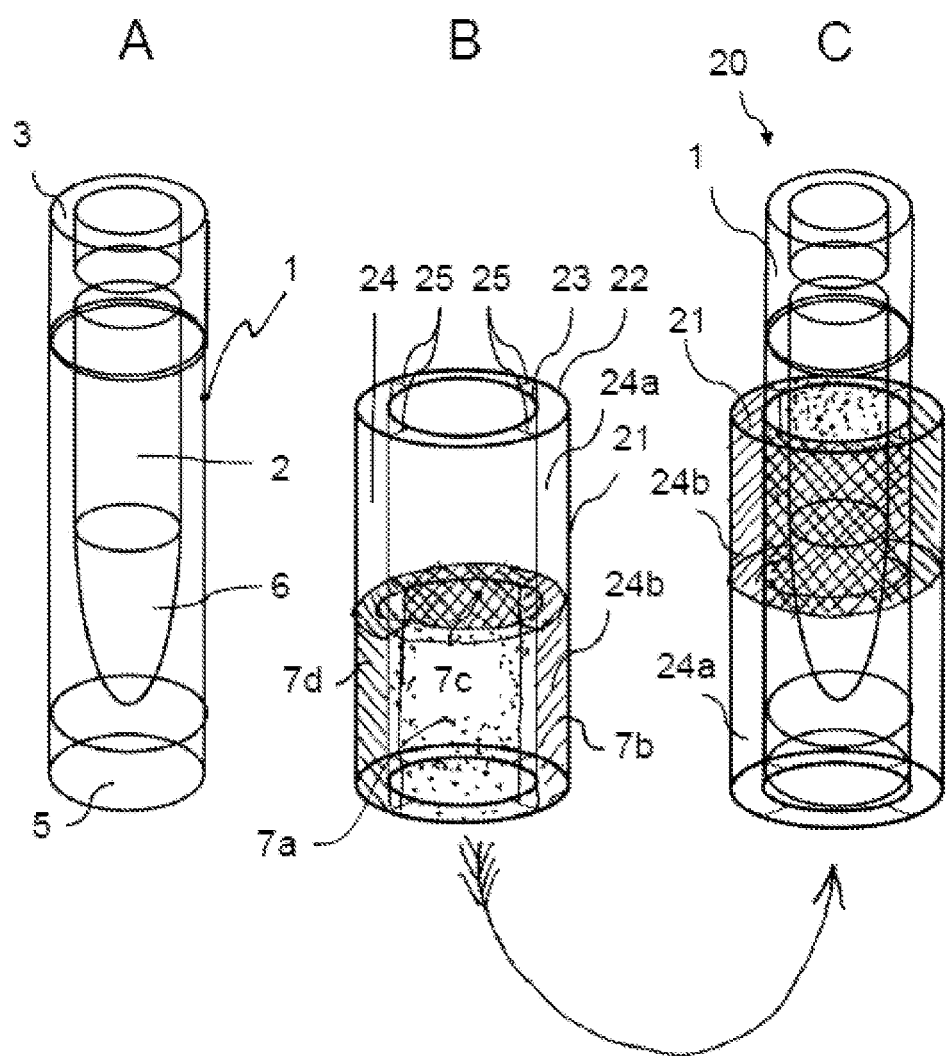

FIG. 2 shows an exemplary embodiment of a device 20 which has a cryogenic tube 1 and an indicator apparatus 21. Indicator apparatus 21 is embodied as a hollow cylinder which can be pushed from the bottom (or top) onto a cryogenic tube 1 in the very cold state. In this case, a cryogenic tube 1, which is embodied in a manner known per se and which is shown by way of example in FIG. 2A, may be used. In this case, the cryogenic tube shown in FIG. 2A only differs from that shown in FIG. 1A in that a conventional base part 5 is used which is not partially filled with indicator substance.

The hollow cylinder is embodied to be double-walled with an inner wall 23 and an outer wall 22, wherein an intermediate space 24 between inner wall 23 and outer wall 22 is partially filled with the indicator substance.

FIG. 2B shows, as an exemplary embodiment variant of cylinder 22, a four-chamber system with four different indicator substances 7a, 7b, 7c, 7d. Intermediate space 24 is divided in this case by separating walls 25 into four sub-cavities which are partially filled in each case with an indicator substance. Various indicator substances 7a, 7b, 7c, 7d are selected here so that their melting points are different and correspond in each case to a temperature threshold value to be monitored.

Indicator apparatus 21 is cooled in the first position shown in FIG. 2B to the storage temperature, wherein indicator liquids 7a, 7b, 7c, 7d freeze solid in each case in lower sub-volume 24b of intermediate space 24.

Indicator apparatus 21 is, after cooling to the storage temperature, pushed onto cryogenic tube 1 rotated by 180° (second position), which is represented in FIG. 2C.

If the distribution shown in FIG. 2C of indicator substances 7a, 7b, 7c, 7d can be determined after storage or also during storage, i.e. all indicator substances 7a, 7b, 7c, 7d are located in upper part 24b of intermediate space 24 of cylinder 21, none of the melting temperatures of indicator substances 7a, 7b, 7c, 7d have been reached. If, however, an indicator substance is located in sub-region 24a, its melting point was exceeded in the interim.

In order to avoid an unauthorized replacement, the coefficients of expansion of the plastic materials of cryogenic tube 1 and of cylinder 21 may be selected to be different and indeed so that bringing cylinder 21 slightly below the lowest melting temperature of indicator substances 7a, 7b, 7c, 7d is performed and that at the storage temperature of cylinder 21 wedges with the outer wall of cryogenic tube 1 and is thus more difficult to detach. If someone thus heats up the sample in an unauthorized manner, he or she would have to immediately replace cylinder 21, which can be avoided in that these cylinders 21 are not freely available at the cryogenic tanks.

Figure 3:
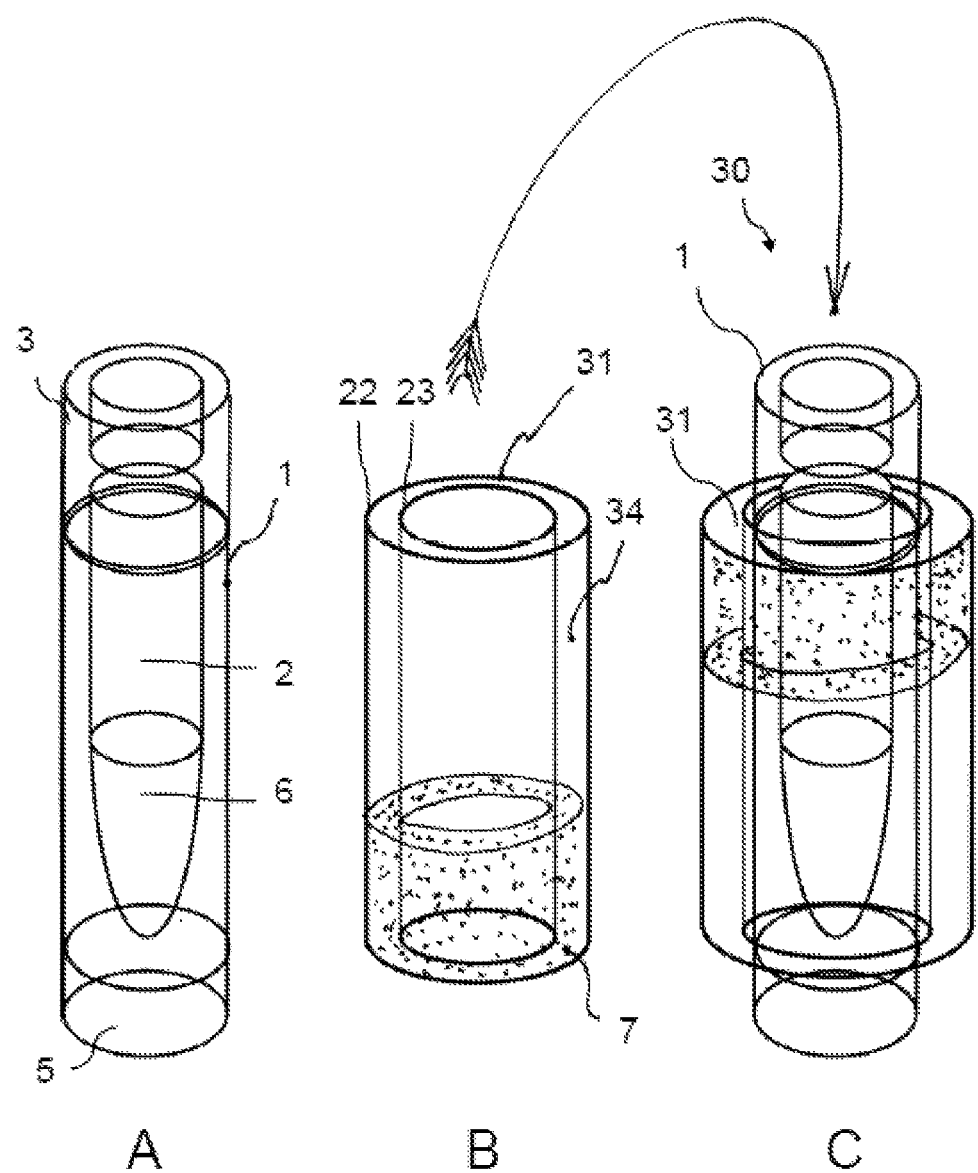

FIG. 3 shows a further device 30 for temperature monitoring of a cryopreserved biological sample. Device 30 has, in an analogous manner to FIG. 2, a hollow-walled cylinder 31 which can be applied from below or above onto a cryogenic tube 1. The difference to the variant shown in FIG. 2 lies in the fact that cylinder 31 is only filled partially with an indicator substance 7. Intermediate space 34 between outer wall 22 and inner wall 23 of the double-walled cylinder shell is thus not divided as in FIG. 2 into sub-spaces which are fluidically separate from one another. Freezing and pushing on are also carried out here in a position rotated by 180°, as shown in FIG. 3B and FIG. 3C. Both cylinder 31 and indicator substance quantity 7 contained therein can be embodied to be much shorter and smaller in volume than shown here, typically ⅓ to ⅕ of the length shown.

Figure 4:
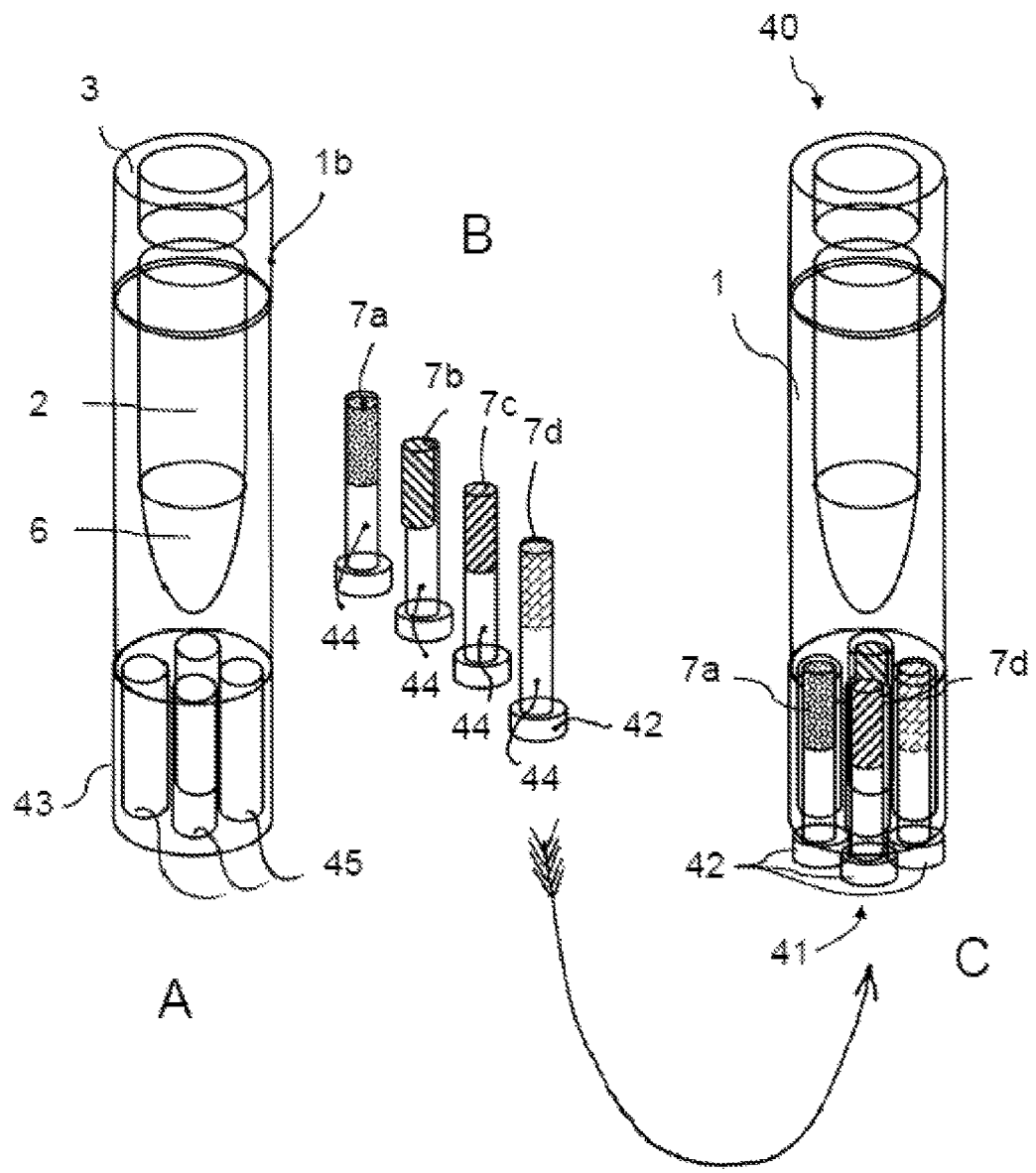

FIG. 4 shows a further device 40 for temperature monitoring of a cryopreserved biological sample. The sample container is in turn embodied as cryogenic tube 1b. A base part 43 which has four receiving cylinder openings 45 into which pins 42 filled partially with an indicator substance 7a, 7b, 7c, or 7d with a cylindrical inner volume 44 can be inserted can be fastened to cryogenic tube 1b. Freezing and insertion are carried out in an analogous manner to the exemplary embodiments shown in FIGS. 2 and 3, i.e. in positions rotated by 180° with respect to one another, and produces in the case of correct storage the image shown in FIG. 4C. Both receiving cylinders 45 and pins 42 are embodied so that they are locked during insertion.

In the event of an exceeding of the respective melting temperature of one of indicator substances 7a, 7b, 7c, 7d, this flows onto the base of volume 44, which is easily apparent or detectable. If sample 6 has been kept under the melting points of indicator substances 7a, 7b, 7c, 7d at all times, instead the state as shown in FIG. 4C is produced. In this manner, inadmissible heating of sample 6 is easily apparent.

Figure 5:
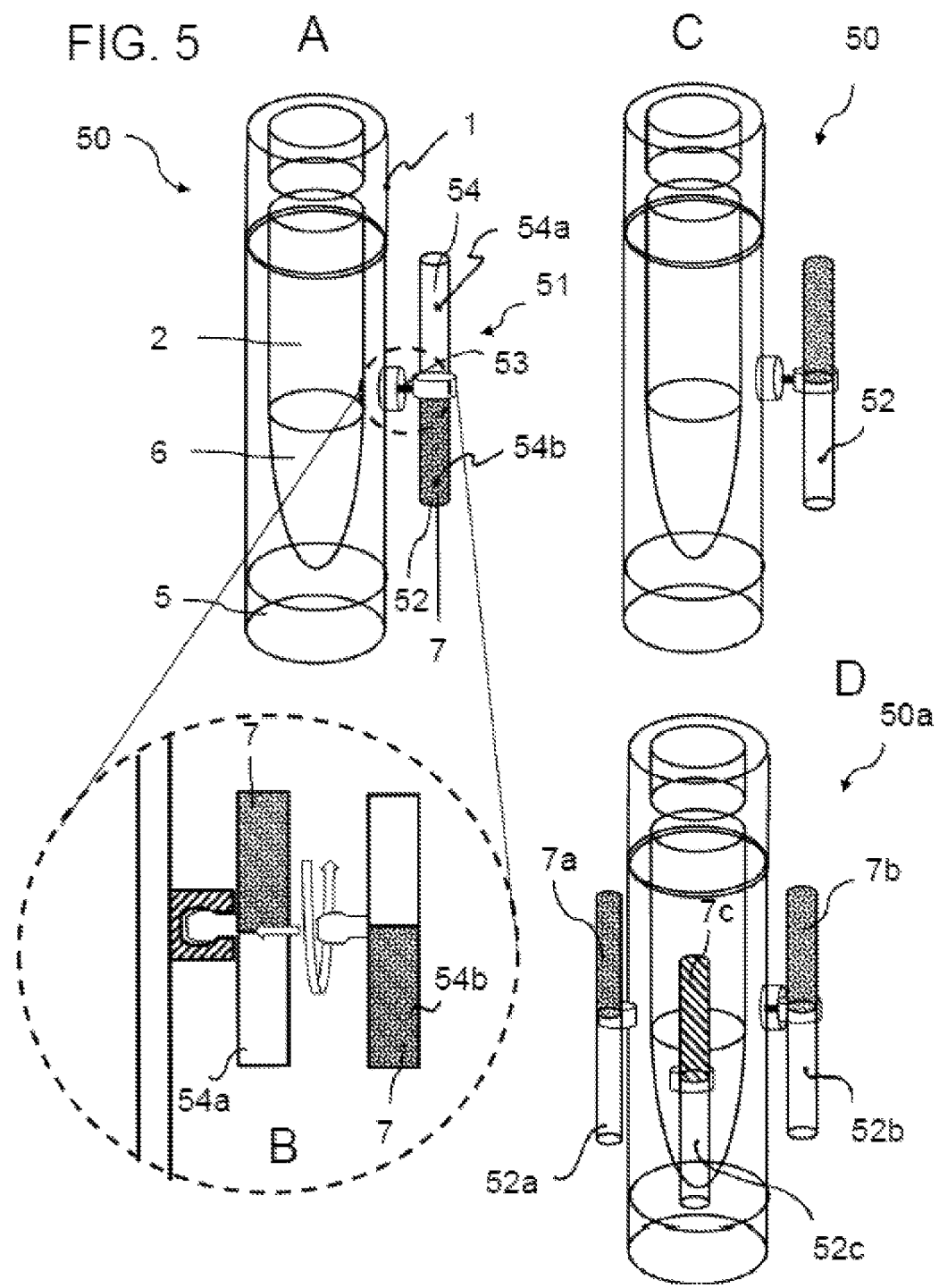

FIG. 5 shows two further devices 50 and 50a for temperature monitoring of a cryopreserved biological sample.

FIG. 5A shows an exemplary embodiment of a cryogenic tube 1, to the side of which an indicator apparatus 51 is rotatably fastened. Indicator apparatus 51 has a hollow cylinder 52, cavity 54 of which is filled partially with an indicator substance 7. Hollow cylinder 52 is fastened rotatably to cryogenic tube 1 via an axis 53. The diameter of hollow cylinder 52 is smaller than that of cryogenic tube 1.

In order to be able to use device 50 for temperature monitoring of a cryopreserved biological sample, cryogenic tube 1 and indicator apparatus 51 in the position shown in FIG. 5A (first position) are now brought to the storage temperature. The indicator substance freezes in lower sub-volume 54b of hollow cylinder 52.

Now fully frozen indicator apparatus 51 is rotated by 180°, as is illustrated in the enlarged representation of FIG. 5B, so that frozen indicator substance 7 is located at the top and liquid-free part 54a is located at the bottom (second position).

In the second position shown in FIG. 5C, a melting of the indicator substance leads, as a result of the influence of gravity, to the liquefied indicator substance flowing downwards into sub-region 54a. In an analogous manner to the examples of the previous figures, it is thus possible to detect on the basis of this state whether an undesirable, if only temporary heating of cryogenic sample 6 has taken place.

Hollow cylinder 52 which is partially filled with indicator substance 7 can either be fastened in a rotatably fixed manner to cryogenic tube 1 or can be fastened rotatably and detachably to cryogenic tube 1 by means of at least one plug connection, latching connection, clamping connection, screw connection and/or click connection. A variant which can be clicked in is shown by way of example in FIG. 5B.

FIG. 5D shows a further variant 50a which differs from device 50 in that not only one hollow cylinder filled with indicator substance 7 is fastened laterally to the cryogenic tube, but rather several, wherein indicator substances 7a, 7b, 7c in hollow cylinders 52a, 552b, 52c differ in terms of their melting points so that various temperature threshold values can be monitored.

Figure 6:
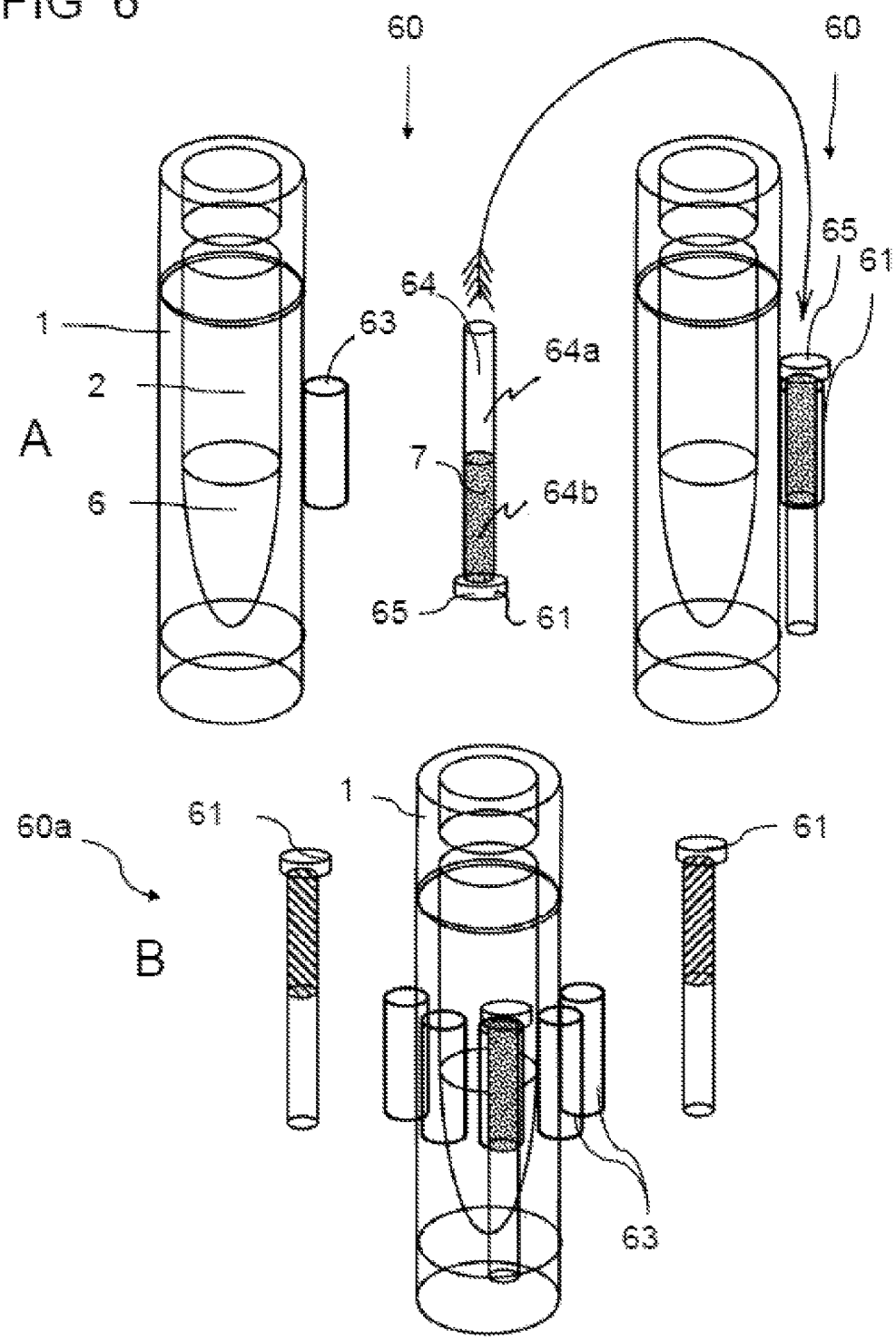

FIG. 6 shows two further devices 60 and 60a for temperature monitoring of a cryopreserved biological sample. FIG. 6 shows, in upper row A, a cylindrical receptacle 63 on the outer wall of cryogenic tube 1, into which a hollow cylinder 61, inner space 64 of which is partially filled with an indicator substance 7, can be inserted, as is shown on the far right. Disc 65 prevents cylinder 61 from slipping through.

In an analogous manner to the previous embodiment variants, the indicator apparatus in the form of the partially filled hollow cylinder is, in a first position, cooled below the melting point of indicator liquid 7. FIG. 6A shows hollow cylinder 61 standing on disc 65 in this first position. The indicator liquid flows into sub-region 64b and freezes there. For cryogenic storage, the hollow cylinder is inserted into receptacle 63 rotated by 180° (second position), which is represented in the top-right in FIG. 6. In this arrangement, it is then possible to check again whether a change in position of indicator substance 7 in inner space 64 occurs or has occurred during cryogenic storage.

FIG. 6B shows how this principle can be multiplied. In the case of device 60a, several hollow cylinders 61 are fastened to cryogenic tube 1, wherein the indicator substances in hollow cylinders 52a, 552b, 52c differ in terms of their melting points so that various temperature threshold values can be monitored.

Figure 7:
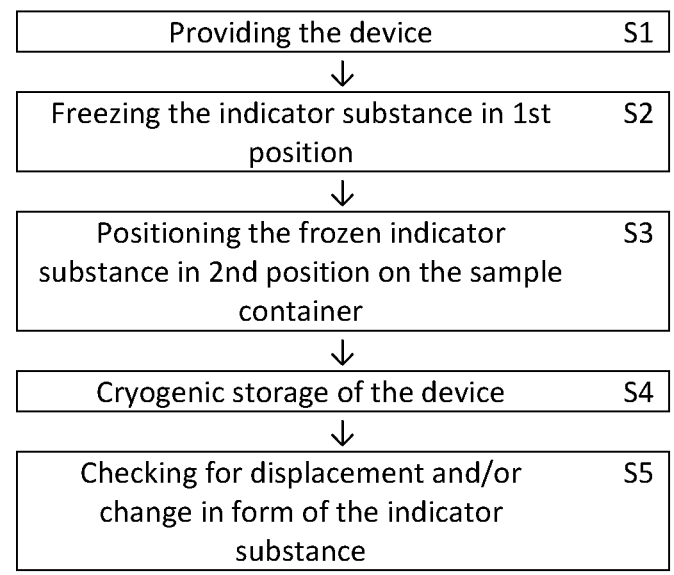
FIG. 7 shows a flow chart to illustrate an exemplary embodiment of a method for temperature monitoring of a cryopreserved biological sample.

FIG. 7 illustrates on the basis of a flow chart a method for temperature monitoring of a cryopreserved biological sample. In step S1, a device for temperature monitoring is provided, for example, one of devices 10, 20, 30, 40, 50, 50a, 60 or 60a. In this case, depending on the temperature threshold value which is supposed to be monitored in the case of cryogenic storage, a suitable liquid or a liquid mixture is to be selected as indicator substance 7.

Via the selection of suitable liquids and the mixture ratio of liquids, their melting point can be set to a desired value in a range from −20° C. to −140° C.

Figure 8A:
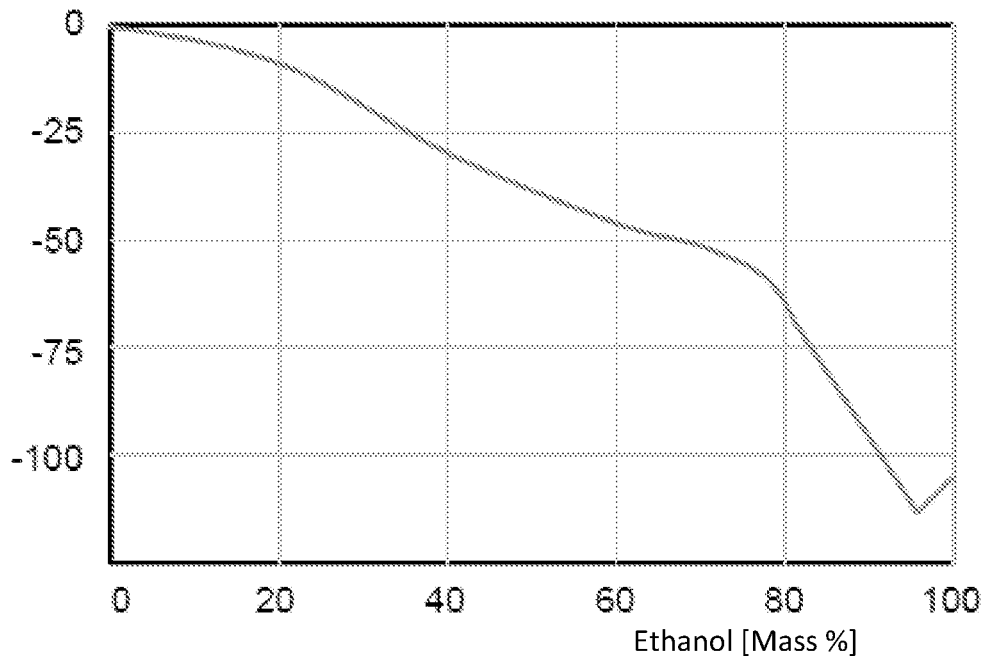
FIGS. 8A, 8B, 9A show in each case a melting diagram of a liquid mixture.
Figure 8B:
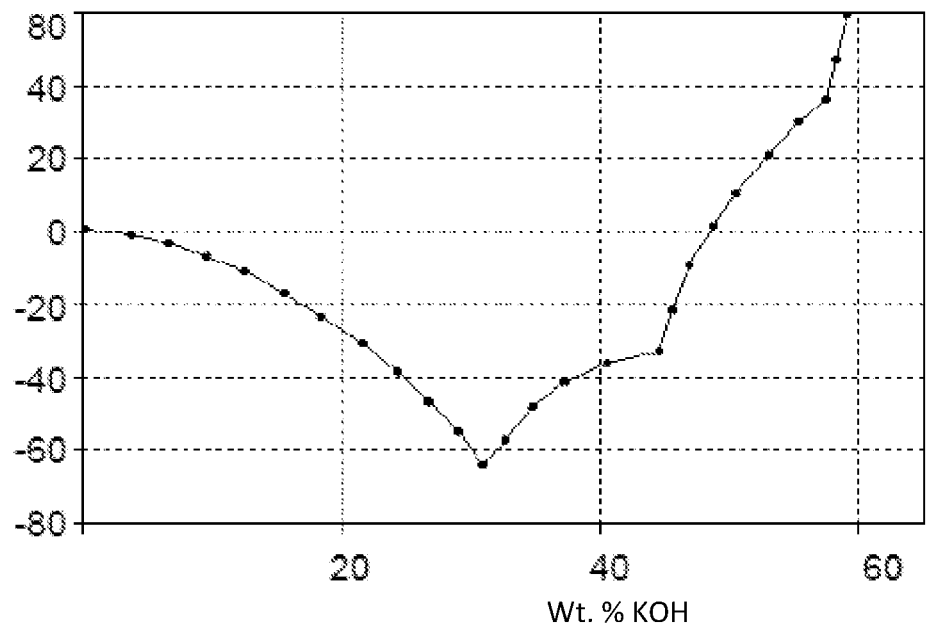
Figures 9A, 9B:
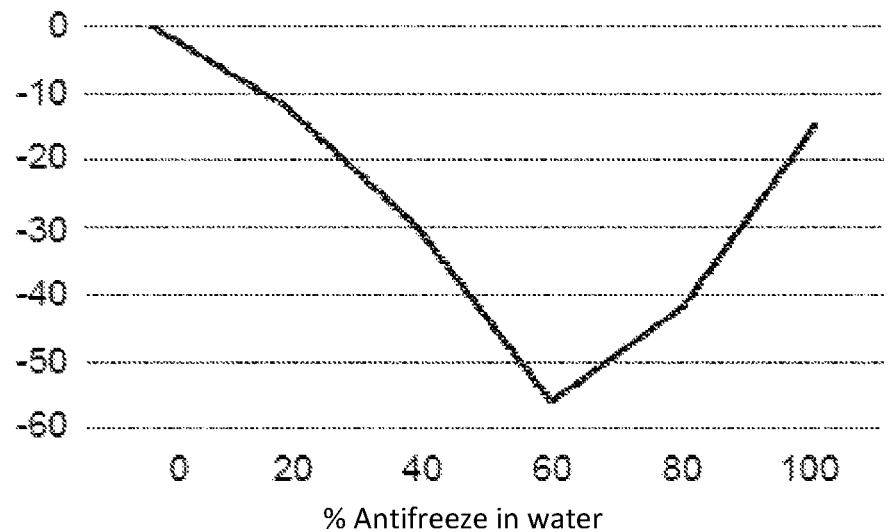
FIG. 9B shows a table with melting points of a number of pure liquids.

By way of example, FIG. 8A indicates the profile of the melting point as a function of the mixture ratio of an alcohol and water, with which, in the case of a moderate increase in viscosity with falling temperature, a temperature range between 0° C. and −118° C. can be covered. Should e.g. a temperature threshold value of −118° C. be monitored, the ethanol ratio can be set at 93.5%. Melting points up to a value of slightly below −60° C. can also be set by adding potassium hydroxide (KOH) to water, which is shown in FIG. 8B on the basis of a melting diagram. A mixture of water and antifreeze can also be used as the indicator substance, which is illustrated by the melting diagram of FIG. 9A. The table of FIG. 9B lists freezing points/melting points of further pure liquids which can be used on their own or as a mixture with another liquid as the indicator substance. Further liquid mixtures which are suitable as the indicator substance include chloroform/cyclohexane mixtures or other mixable liquids which can be inferred e.g. from the mixability matrix of solvents of FIG. 10.

Liquids and plastic materials with good wettability and low viscosity at low temperatures are primarily selected in order to configure the change in position to be as extensive as possible and the additional compartment as small as possible.

If several temperature threshold values are supposed to be monitored during cryogenic storage or if the achieved temperature intervals which the sample reaches should be restricted more precisely, several different indicator substances with different melting points can correspondingly be used which are then arranged in different cavities or chambers on the sample container.

In step S2, the indicator substance in the cavity of the indicator apparatus is then frozen, wherein the cavity is moved into a first position during freezing of the indicator substance. In the case of different indicator substances and several cavities, these are moved in an analogous manner in each case into a first position and frozen.

Thereafter, in step S3, the at least one cavity with the frozen indicator substance is moved into a second position and, if the at least one cavity is not yet arranged on the sample container, arranged thereon. The second position changes the spatial position of the frozen indicator substance at least to such an extent that a melting after the change in position leads to a visible displacement of the liquid or its delimiting geometry in the cavity.

In this state, the device can be stored with a cryosample in the receiving space of the sample container in the case of a storage temperature below the melting temperature (step S4).

It is subsequently possible to check by means of the indicator substance at any desired point in time during the storage process whether an undesirable, if only temporary heating of the cryosample has taken place (step 5). To this end, a check is made as to whether an at least partial displacement and/or change in form of the indicator substance(s) caused by a melting process has taken place. If this is the case, an exceeding of the threshold temperature(s) to be monitored can be concluded.

Although the invention has been described with reference to specific exemplary embodiments, it is apparent for a person skilled in the art that various changes can be made and equivalents can be used as a replacement without departing from the scope of the invention. The invention should consequently not be restricted to the disclosed exemplary embodiments, but rather should enclose all the exemplary embodiments which fall into the scope of the enclosed claims. In particular, the invention also claims protection for the subject matter and the features of the subordinate claims independently of the claims referred to.

The invention claimed is:

1. A device for temperature monitoring of a cryopreserved biological sample, comprising
   a) a sample container with a receiving space for receiving a biological sample; and
   b) an indicator apparatus which can be arranged and/or is arranged on an outside of the sample container for monitoring at least one temperature threshold value, having at least one cavity which is only partially filled with an indicator substance, the melting temperature of which lies in a range from −20° C. to −140° C., wherein the device comprises one feature selected from the group consisting of:
   feature i) the indicator apparatus is fastened as a base part to the sample container and has on its underside at least one insertion opening, in which a pin-shaped container, which is only partially filled with the indicator substance, is detachably retained;
   feature ii) the sample container is a cryogenic tube and the indicator apparatus is a hollow cylinder, which, for fastening to the cryogenic tube, can be pushed and/or is pushed onto an outer shell surface of the cryogenic tube, wherein the hollow cylinder is double-walled with an inner wall and an outer wall, wherein an intermediate space between the inner wall and the outer wall, which forms the at least one cavity, is partially filled with the indicator substance; and
   feature iii) the indicator apparatus has at least one hollow body, which is only partially filled with the indicator substance and is fastened to a lateral outer wall of the sample container, and the device further comprises a receptacle into which the hollow body is insertable and/or is inserted for retention on the sample container, wherein the receptacle is fastened to a lateral outer wall of the sample container.

2. The device according to claim 1, wherein the indicator apparatus or the at least one cavity of the indicator apparatus
   a) can be fastened and/or is fastened detachably to the sample container; and/or
   b) can be fastened detachably to the sample container by at least one plug connection, latching connection, clamping connection, screw connection and/or click connection.

3. The device according to claim 1, wherein the indicator apparatus at at least one point is transparent or semi-transparent so that the at least one cavity is observable from the outside.

4. The device according to claim 1, wherein the device comprises feature i), the sample container is a cryogenic tube and the indicator apparatus is a cylindrical body which can be fastened as a base part to the cryogenic tube.

5. The device according to claim 4, wherein the cylindrical body
   a) has an outer diameter the same as the cryogenic tube and/or
   b) is transparent or semi-transparent.

6. The device according to claim 1, wherein the device comprises feature ii), the hollow cylinder is produced from a first plastic material and the cryogenic tube is produced from a second plastic material, wherein the first plastic material has a greater thermal contraction than the second plastic material in case of a reduction in temperature, at least in a temperature range below the melting temperature of the indicator substance.

7. The device according to claim 1, wherein the device comprises feature iii).

8. The device according to claim 1, further comprising an optical or optoelectrical measuring apparatus which is configured to detect a position and/or form of the indicator substance in the at least one cavity of the indicator apparatus.

9. The device according to claim 1, wherein the indicator substance comprises at least one alcohol selected from the group consisting of octan-1-ol, nonan-1-ol, propane-1,2-diol, propane-1,3-diol, butane-1,2-diol, butane-1,3-diol, butane-2-ol, pentane-1,5-diol, pentan-1-ol, cyclopentanol, and benzyl alcohol as well as optionally at least one dye.

10. The device according to claim 9, wherein the at least one dye is selected from the group consisting of triphenylmethane dyes, rhodamine dyes, azo dyes, phenazine dyes and phenothiazine dyes.

11. The device according to claim 9, wherein the indicator substance comprises at least two alcohol components selected from the group consisting of octan-1-ol, nonan-1-ol, propane-1,2-diol, propane-1,3-diol, butane-1,2-diol, butane-1,3-diol, butane-2-ol, pentane-1,5-diol, pentan-1-ol, cyclopentanol, and benzyl alcohol and/or the indicator substance comprises at least one dye selected from the group consisting of oil red, methyl red, brilliant green, rhodamine B, neutral red, and methylene blue.

12. A method for temperature monitoring of cryopreserved samples, comprising the steps:
   a) providing a device for temperature monitoring according to claim 1;
   b) freezing the indicator substance; and
   c) monitoring the temperature of the cryopreserved samples, wherein the at least one cavity of the indicator device is moved into a first position during freezing of the indicator substance and, after freezing and at a temperature of the indicator substance below the melting temperature, is moved into a second position in which a melting of the indicator substance leads, as a result of an influence of gravity, to an at least partial displacement and/or change in shape of the indicator substance in the at least one cavity.

13. The method according to claim 12, wherein a substance is selected as the indicator substance, the melting temperature of which or the threshold temperature of which, at which a viscosity of melted indicator substance exceeds a determined setpoint value, corresponds to a predetermined threshold temperature, the exceeding of which is monitored.

14. The method according to claim 12, further comprising
   a) storing of a cryopreserved sample in the sample container; and
   b) determining whether a change in form, and/or arrangement, of the indicator substance performed by temporarily exceeding the melting temperature of the indicator substance has taken place.

* * * * *